March 11, 1947. R. E. EGGERT ET AL 2,417,245
SELF-LOCKING CLIP
Filed Jan. 25, 1945
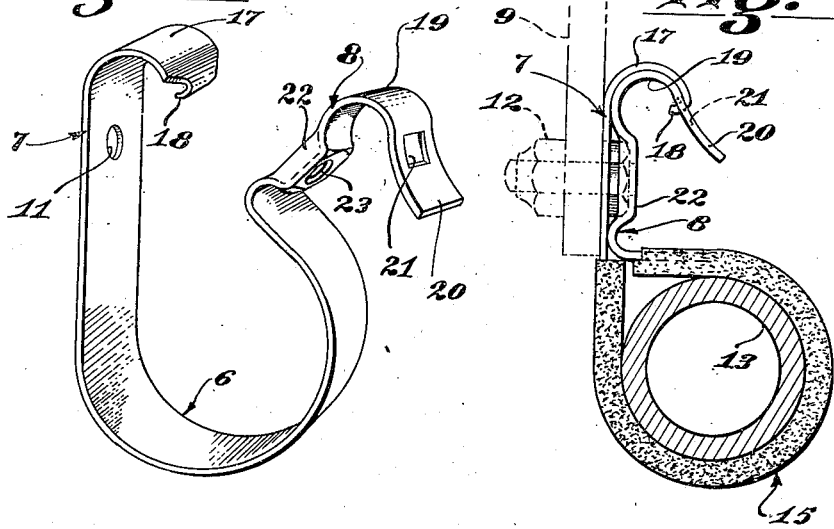
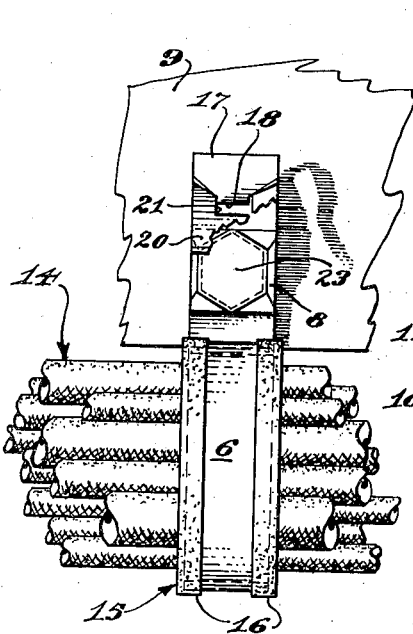
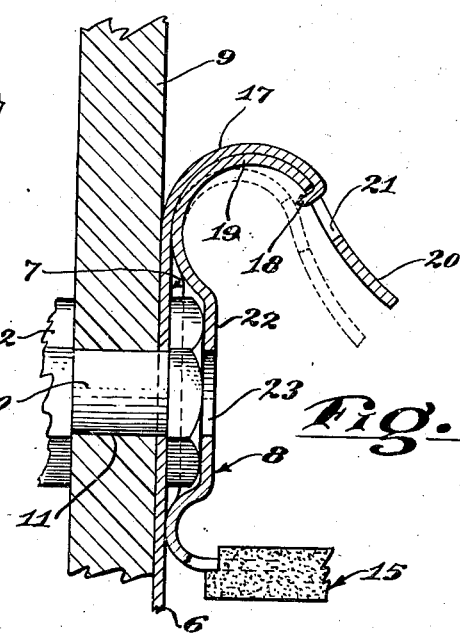
Inventor
RONALD EDGAR EGGERT &
LEONARD C. BROSE Patented Mar. 11, 1947

2,417,245

UNITED STATES PATENT OFFICE 2,417,245

SELF-LOCKING CLIP

Ronald Edgar Eggert and Leonard Carl Brose, Burbank, Calif., assignors to Adel Precision Products Corp., a corporation of California Application January 25, 1945, Serial No. 574,526

4 Claims. (Cl. 248—74)

This invention relates to clips for supporting conduit lines, tubing, bundles of wires and like lines, particularly in aircraft where such lines are anchored at closely spaced intervals to structural parts past and adjacent which they extend.

An object of this invention is to provide a clip of the character above noted which will be self-locking when closed around the wires, conduit line or object to be embraced and supported thereby and will remain securely locked but may be readily released and opened to remove and replace wires or the conduit without removing the clip from the structural member on which it is mounted.

A further object is to provide a clip such as described in which the free ends thereof are constructed so that upon being brought together they will interlock with a snap action subject to release upon intentional manipulation of one of said ends.

A further object is to provide a clip such as described having an additional holding means formed on one end thereof as a socket or depression for reception of the head of a bolt or screw which is passed through the other end of the clip to secure the clip to a support, this socketing of the screw or bolt preventing relative movement of said ends such as would release the interlocked portions of said ends and making it necessary to forcibly spring one end out of interlocking engagement with the other end in order to open the clip.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clip embodying my invention;

Fig. 2 is a side elevation of the clip as installed;

Fig. 3 is a front elevation of the clip as when supporting a bundle of wires;

Fig. 4 is an enlarged fragmentary vertical sectional view of the clip.

Referring to the drawing more specifically, it is seen that one form of clip embodying my invention embodies a resilient metal strap bent into the form of an open loop 6 having outwardly extended normally spaced apart ends 7 and 8. The ends are constructed and arranged to be secured together and to a support 9 as shown in Fig. 2. A bolt 10 is inserted through an opening 11 in the end 7 of the loop and is turned in a nut 12 for the purpose of securing the clip to the support 9.

Fig. 2 shows the clip as employed to support a conduit 13 whereas Fig. 5 shows the clip as supporting a bundle of wires 14. In this connection it should be noted that a resilient cushion 15 of rubber, synthetic rubber or the like may be mounted on the loop to absorb vibration and prevent wear of the conduit or wires, there being rebent flanges 16 on the cushion embracing the side edges and outer face of the loop to hold the cushion in place.

In accordance with this invention the ends 7 and 8 near their outer extremities are constructed and arranged to be hooked together with a snap action at points beyond the opening 11 while the end 7 is secured to the support 9, and to be unhooked while the end 7 is secured to the support, without requiring removal of the clip or loosening of the bolt 10. Once hooked together the ends will be securely held so that the loop is locked around the conduit or wires against opening accidentally responsive to vibration or other forces, it being necessary to forcibly and intentionally depress one of the ends relative to the other to unhook them and open the loop.

As here shown the end 7 near its outer extremity is bent over and back towards the loop 6 to form a large hook 17 having a reduced free or bill end rebent inwardly to form a small locking tongue or hook 18. The other end 8 at a point near its outer extremity is bent back to form a rounded or similar protuberant portion 19 adapted to fit into the hook 17 as well as to form an extended lip or finger piece 20 constituting the extreme free end of end portion 8 and enabling the depression of the rounded portion 19 to disengage it from the hook 17. At the juncture of the rounded portion 19 and the extended finger piece 20 a slot 21 is formed for reception of the locking hook or lip 18.

When the ends 7 and 8 are forced together, for example, as by pushing the end 8 towards end 7, the rounded portion 19 will ride on and past the hook 18 and snap into the large hook 17 while at the same time the small locking hook 18 will snap into the slot 21 thereby locking the ends 7 and 8 together. The ends 7 and 8 throughout are resilient, yieldable and so tensioned that they may be locked as aforesaid with a snap action, the rounded portion 19 and the lip 20 being under such tension that they will spring outwardly and remain in close contact with the hooks 17 and 18. However, when it is desired to unhook the ends 7 and 8 and open the loop 6, the operator depresses the lip 20 and rounded portion 19 as shown in Fig. 4 to disengage them from the hooks 17 and 18 and then pulls outwardly on the lip to separate ends 7 and 8 to open the clip. After initially placing or replacing a conduit or wires in the clip, the loop may be readily closed and locked by pushing end 8 towards end 7 and again interlocking them in the manner hereinbefore noted.

As an additional means for holding the ends 7 and 8 together, the end 8 at a point opposite the opening 11 in end 7 is formed with a depression or socket 22 opening on the inner face of end 8 and adapted to receive the head of the bolt 10 as shown in Figs. 2 and 4. This socketing of the bolt head prevents relative movement of the ends 7 and 8 such as would disengage the interlocked portions thereof, that is, it prevents the end 8 from being pulled down such that the rounded portion 19 would be withdrawn from the hooks 17 and 18. If desired the socket may be shaped to conform to the shape of the bolt head and as here shown is hexagonal for such purpose. However, the socket is spaced away from the rounded portion 19 sufficiently to permit of the intentional manipulation of the lip 20 and said rounded end to disengage the interlocked portions of the ends 7 and 8 as shown in Fig. 4.

If desired a bolt or screw may be inserted through both ends then through the support, there being an opening 23 in the socket for registration with opening 11 whereby the bolt or screw may be applied in this manner. When this method of installation is employed it is possible to make a sub-assembly of the clip on wires or a conduit with the ends 7 and 8 locked together by means of the hooks 17 and 18 and cooperating elements or end 7, after which the screw or bolt may be inserted through both ends as above stated.

It should be noted that when the ends 7 and 8 are locked together portions of the end 8 on opposite sides of the socket 22 will seat against the end 7. This seating of end 8 together with the holding action of the hook 18 will effectively resist the pulling of the end 8 downwardly or outwardly relative to end 7, such as would disengage the interlocked elements of said ends. However the socketing of the bolt in end 8 positively prevents this relative movement of said ends and also is necessary to permit the ends to be interlocked and seated one on the other as here provided.

It will now be seen that the clip hereof will afford the advantages and objects hereinbefore noted in a particularly efficacious manner by reason of a simple and easily provided interlocking means of integral formation with the strap of which the clip is formed, such formation being readily stamped and requiring no separate parts other than a bolt or screw to hold the clip on a support.

While we have shown and described a specific embodiment of our invention, we do not limit ourselves to the exact details of construction set forth, and the invention embraces such changes, modifications and equivalents of the parts and their formation and arrangement as come within the purview of the apended claims.

We claim:

1. In a clip for supporting a conduit or a bundle of wires, a resilient metal strap bent to form an open loop for embracing a conduit or bundle of wires, outwardly extended end portions on said loop normally in spaced opposed relation to one another and adapted to be brought together to close the loop, one of said end portions being bent over adjacent the outer extremity thereof to form a large hook facing inwardly toward the loop and having a reduced free end which is rebent to form a locking hook, the other of said end portions being bent over to define a protuberant portion shaped to hook into said large hook and having an opening therein to receive said locking hook to hold said end portions in interlocked engagement with one another, and a finger piece constituting the outer extremity of the second named end portion, extending from said protuberant portion and subject to manipulation to disengage the protuberant portion from said hooks; said first named end having an opening therein between the large hook thereon and the loop proper for reception of a fastening for securing the clip to a support.

2. In a clip for supporting a conduit or a bundle of wires, a resilient metal strap bent to form an open loop for embracing a conduit or bundle of wires, outwardly extended end portions on said loop normally in spaced opposed relation to one another and adapted to be brought together to close the loop, one of said end portions being bent over adjacent the outer extremity thereof to form a large hook facing inwardly toward the loop and having a reduced free end which is rebent to form a locking hook, the other of said end portions being bent over to define a protuberant portion shaped to hook into said large hook and having an opening therein to receive said locking hook to hold said end portions in interlocked engagement with one another, a finger piece constituting the outer extremity of the second named end portion, extending from said protuberant portion and subject to manipulation to disengage the protuberant portion from said hooks; said first named end having an opening therein between the large hook thereon and the loop proper for reception of a fastening for securing the clip to a support, and a socket in the second named end portion arranged to receive an end of said fastening when said end portions are interlocked.

3. In a clip for supporting a conduit or a bundle of wires, a resilient metal strap bent to form an open loop for embracing a conduit or bundle of wires, outwardly extended end portions on said loop normally in spaced opposed relation to one another and adapted to be brought together to close the loop, one of said end portions being bent over adjacent the outer extremity thereof to form a large hook facing inwardly toward the loop and having a reduced free end which is rebent to form a locking hook, the other of said end portions being bent over to define a rounded portion shaped to hook into said large hook and having an opening therein to receive said locking hook to hold said end portions in interlocked engagement with one another, a finger piece constituting the outer extremity of the second named end portion, extending from said rounded portion and subject to maniuplation to disengage the rounded portion from said hooks; said first named end having an opening therein between the large hook thereon and the loop proper for reception of a fastening for securing the clip to a support, and a socket in the second named end portion arranged to receive an end of said fastening when said end portions are interlocked, said socket having a fastening-receiving opening in the bottom thereof adapted to register with the opening in the first named end portion.

4. In a clip for supporting a conduit or a bundle of wires, a resilient metal strap bent to form an open loop for embracing a conduit or bundle of wires, outwardly extended end portions on said loop normally in spaced opposed relation to one another and adapted to be brought together to close the loop, one of said end portions being bent over adjacent the outer extremity thereof to form a large hook facing inwardly toward the loop and having a portion which is rebent to form a locking hook, the other of said end portions being bent over to define a portion shaped to fit within said large hook and having an opening therein to receive said locking hook to hold said end portions in interlocked engagement with one another, and a finger piece joined to the second named end portion, extending from said end portions.

RONALD EDGAR EGGERT.
LEONARD CARL BROSE.

REFERENCES CITED

The following references are of record in the file of this patent:

UNITED STATES PATENTS

| Number | Name | Date |
|---|---|---|
| 1,246,325 | Rohmer | Nov. 13, 1917 |
| 2,351,790 | Tinnerman | June 20, 1944 |